(12) United States Patent
Ponnarasu et al.

(10) Patent No.: US 9,933,884 B2
(45) Date of Patent: Apr. 3, 2018

(54) CORRECTING COORDINATE JITTER IN TOUCH SCREEN DISPLAYS DUE TO FORCEFUL TOUCHES

(71) Applicant: STMicroelectronics Asia Pacific Pte Ltd, Singapore (SG)

(72) Inventors: Manivannan Ponnarasu, Singapore (SG); Leo Lee, Yong-In (KP)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 229 days.

(21) Appl. No.: 14/811,884

(22) Filed: Jul. 29, 2015

(65) Prior Publication Data

US 2017/0031493 A1 Feb. 2, 2017

(51) Int. Cl.
*G06F 3/041* (2006.01)
(52) U.S. Cl.
CPC .......... *G06F 3/0416* (2013.01); *G06F 3/0418* (2013.01)
(58) Field of Classification Search
CPC ....................................................... G06F 3/044
See application file for complete search history.

(56) References Cited

U.S. PATENT DOCUMENTS

| | | | | |
|---|---|---|---|---|
| 8,917,257 B2* | 12/2014 | Hatano | ................... | G06F 3/044 345/173 |
| 9,207,822 B1* | 12/2015 | Kremin | ................. | G06F 3/0416 |
| 2011/0242052 A1* | 10/2011 | Ningrat | ................... | G06F 3/044 345/174 |
| 2014/0253488 A1* | 9/2014 | Vukovic | ............... | G06F 3/0418 345/174 |
| 2016/0070413 A1* | 3/2016 | Geaghan | ............... | G06F 3/0416 345/174 |

\* cited by examiner

*Primary Examiner* — Amr Awad
*Assistant Examiner* — Stephen Bray
(74) *Attorney, Agent, or Firm* — Gardere Wynne Sewell LLP (57) ABSTRACT

An electronic device includes a processor that acquires touch data values corresponding to different locations of a touch display, and identifies an island in the touch data that has touch data values acquired from adjacent locations of the touch display that indicate a potential touch. A first area of the island is determined from touch data values that exceed a first threshold value, and a second area of the island is determined from touch data values that exceed a second threshold value. If the first area is less than a multiple of the second area, coordinates of a location of the island are determined from the touch data values indicating the potential touch. If the first area is at least the multiple of the second area, coordinates of a location of the island are determined from the touch data values indicating the potential touch that exceed a third threshold value.

19 Claims, 7 Drawing Sheets

CORRECTING COORDINATE JITTER IN TOUCH SCREEN DISPLAYS DUE TO FORCEFUL TOUCHES

TECHNICAL FIELD

This disclosure relates to the field of touch screen devices, and more particularly, to the accurate acquisition of touch coordinates even when the touch is forceful.

BACKGROUND

Mobile electronic devices, such as smartphones, tablets, and smartwatches are in wide use in the world today. Such electronic devices typically employ a touch sensitive display for both data display as well as to receive user input. Most of these touch sensitive displays utilize capacitive touch sensing.

A typical touch sensitive display includes a display layer constructed from technology such as LCD, IPS, or AMO-LED, as well as a sensing layer. A transparent layer is adjacent to and spaced apart from the display layer. A typical sensing layer includes a plurality of parallel drive lines, and a plurality of parallel sensing lines. The sensing lines capacitively intersect the drive lines. In operation, a single drive line is driven with a wave, such as a square wave or sine wave. The capacitance between the sensing lines and the driven drive line is sensed at the point where they intersect. Presence of a human finger or a conductive object alters the expected capacitance at the intersection point, and by measuring the change in capacitance, a touch between the finger or conductive object and the touch sensitive display can be detected.

However, in some instances, the touch between the finger or conductive object and the transparent layer is sufficient to cause a component or components of the touch sensitive display to bend, ultimately resulting in the registering of a touch at a different, incorrect location. Since accurate determination of the location of the touch is commercially desirable, development of an electronic device able to accurately determine the location of a touch even in the presence of the aforementioned bending is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device in accordance with this disclosure includes a touch sensitive display, with a processor coupled to the touch sensitive display. The processor is configured to acquire touch data values corresponding to different locations of the touch sensitive display, and identify at least one island in the touch data, with the at least one island being touch data values acquired from adjacent locations of the touch sensitive display indicating a potential touch. The processor is further configured to determine a first area of the at least one island based upon touch data values thereof that exceed a first threshold value, and determine a second area of the at least one island based upon touch data values thereof that exceed a second threshold value different than the first threshold value. If the first area is less than a multiple of the second area, the processor determines coordinates of a location of the at least one island on the touch sensitive display based upon the touch data values indicating the potential touch. If the first area is at least the multiple of the second area, the processor determines coordinates of a location of the at least one island on the touch sensitive display based upon the touch data values indicating the potential touch that exceeds a third threshold value and not the touch data values indicating the potential touch that do not exceed the third threshold value.

The second threshold value may be one half a peak touch data value of the at least one island. The multiple of the second area may be twice the second area. The third threshold value may be equal to the first threshold value. The third threshold value may be greater than the first threshold value. A transparent layer may be disposed adjacent to and spaced apart from the touch sensitive display. The first area being at least the multiple of the second area indicates that the potential touch is pushing against the transparent layer with a force sufficient such that the transparent layer is bending toward the touch sensitive display.

The processor may be configured to compare the first area to the second area to determine a force with which the potential touch is pushing against the transparent layer. The processor may be part of a touch screen controller. The processor may be part of a system on a chip. The third threshold value may be between 70% and 95% of a peak touch data value of the at least one island.

Another aspect is directed to an electronic device including a touch screen controller. The touch screen controller is configured to acquire a matrix of touch data values, and identify at least one island in the matrix, with the at least one island comprising adjacent touch data values indicating a potential touch of a touch sensitive screen. The touch screen controller is also configured to determine a first area of the at least one island based upon touch data values thereof that exceed a first threshold value, and determine a second area of the at least one island based upon touch data values thereof that exceed a second threshold value different than the first threshold value. If the first area is at least a multiple of the second area, the touch screen controller determines coordinates of a location of the at least one island on the touch sensitive display based upon the touch data values that exceed a third threshold value but not the touch data values that do not exceed the third threshold value.

Another aspect is directed to a method that includes acquiring touch data values corresponding to different locations of a touch sensitive display, and identifying at least one island in the touch data values, with the at least one island comprising touch data values acquired from adjacent locations of the touch sensitive display indicating a potential touch. The method also includes determining coordinates of a location of the at least one island on the touch sensitive display based upon the touch data values indicating that a transparent layer adjacent to and spaced apart from the touch sensitive display is bending toward the touch sensitive display.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
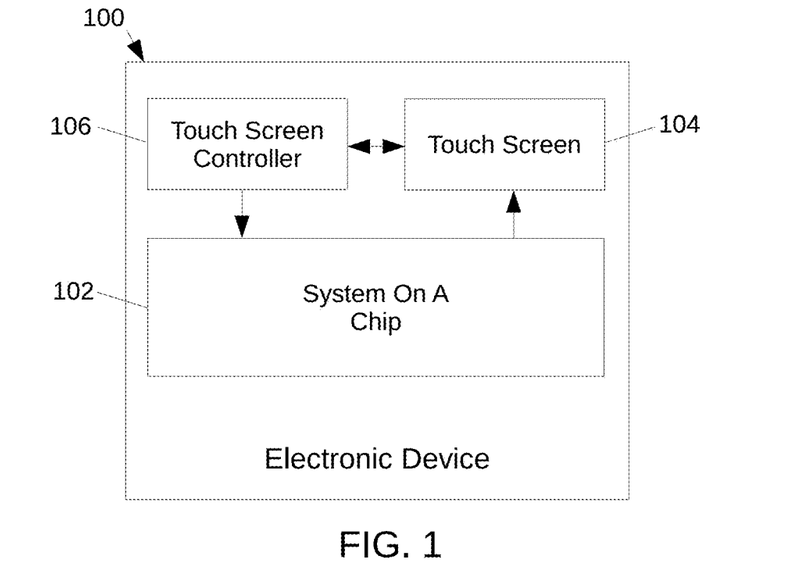
FIG. 1 is a block diagram of an electronic device on which the techniques described herein may be implemented.
Figure 1A:
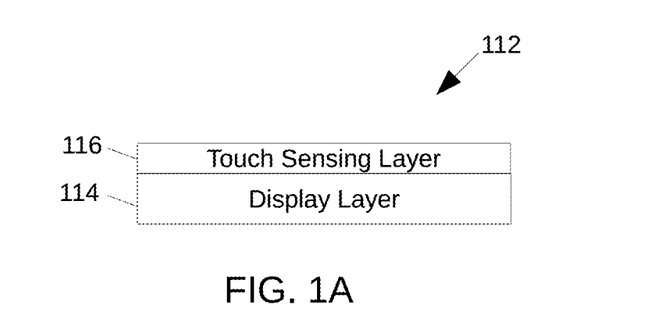
FIG. 1A is a cutaway view of the touch sensitive display of the touch screen of FIG. 1 showing the components thereof.
Figure 1B:
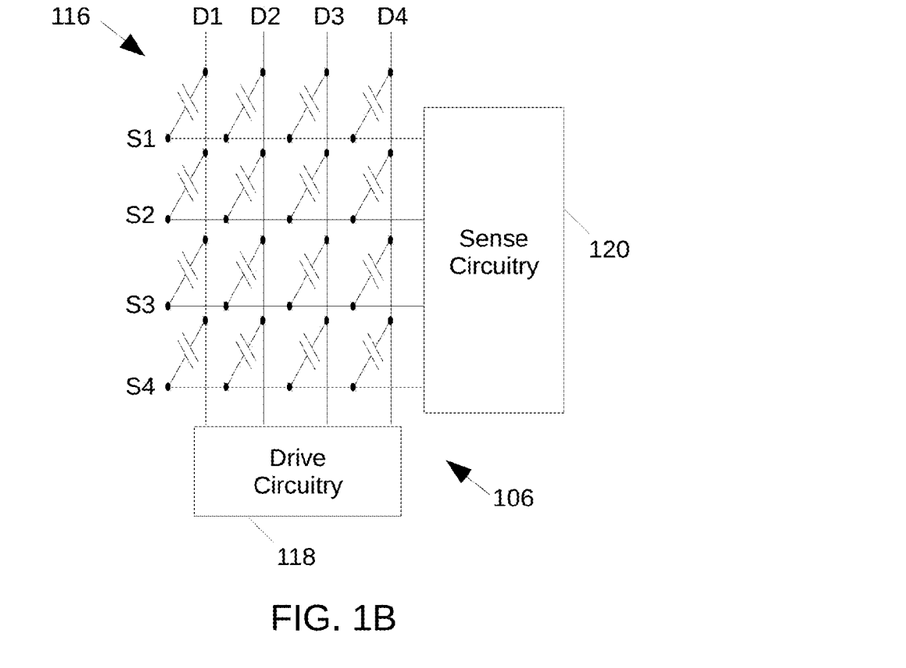
FIG. 1B is a schematic block diagram of the touch screen controller of FIG. 1, and its interconnection with the sense and drive lines of the touch sensing layer of the touch sensitive display of FIG. 1A.
Figure 1C:
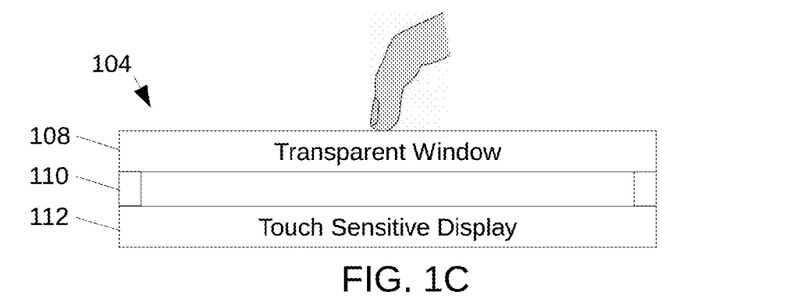
FIG. 1C is a cutaway view of the touch screen of the electronic device of FIG. 1 during a touch that is not forceful.
Figure 1D:
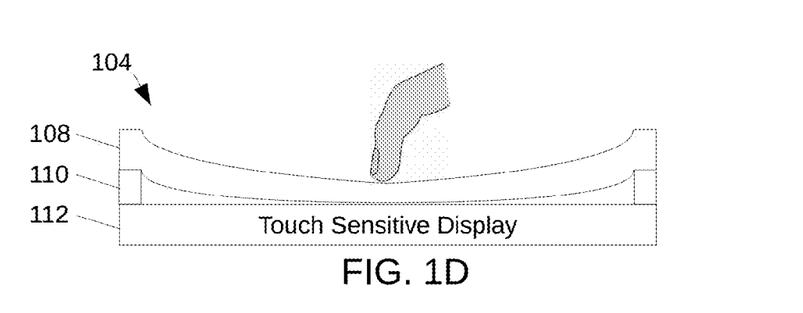
FIG. 1D is a cutaway view of the touch screen of the electronic device of FIG. 1 during a touch that is forceful.

With initial reference to FIGS. 1-1D an electronic device 100 is now described. The electronic device 100 may be a smartphone, smartwatch, tablet, laptop, or other suitable portable electronic device. The electronic device 100 includes a system on a chip 102 that receives input from a touch screen controller 106 and provides output to a touch screen 104. The touch screen 104 includes a touch sensitive display 112 having a transparent window 108 adjacent thereto and spaced apart therefrom by a bezel 110.

The touch sensitive display 112 includes a display layer 114, with a touch sensing layer 116 adjacent thereto. The touch sensing layer 116 includes drive lines D1-D4 that intersect sense lines S1-S4. The sense lines S1-S4 are coupled to the touch screen controller 106, while the drive lines D1-D4 are coupled to drive circuitry 118. At each intersection point between the drive line D1 and the sense lines S1-S4, a capacitance is formed.

In operation, the driving circuitry 118 drives the drive lines D1-D4 with periodic signals, such as sine waves or square waves. At each intersection point between the drive lines D1-D4 and the sense lines S1-S4, the respective sense line S1-S4 incurs a charge injection proportional to the voltage at the drive lines D1-D4 and a capacitance between the respective sense line S1-S4 and the drive lines D1-D4 is at that intersection point. These capacitances vary in proximity to conductive objects, such as human fingers, and are measured by the touch screen controller 106 and processed to be touch data values stored in a matrix having entries that correspond to the various intersections of the drive lines D1-D4 with the force lines S1-S4.

As shown in FIG. 1C a touch that is not "forceful" does not bend the transparent window 108 toward the touch sensitive display 112. However, as shown in FIG. 1D, a touch may be "forceful" in that it bends the transparent window 108 sufficiently to contact the touch sensitive display 112, and alter the touch data values that are collected. This alteration of the touch data values results in inaccurate determination of the coordinates of touches, which degrades the user experience of the electronic device 100.

Figure 2A:
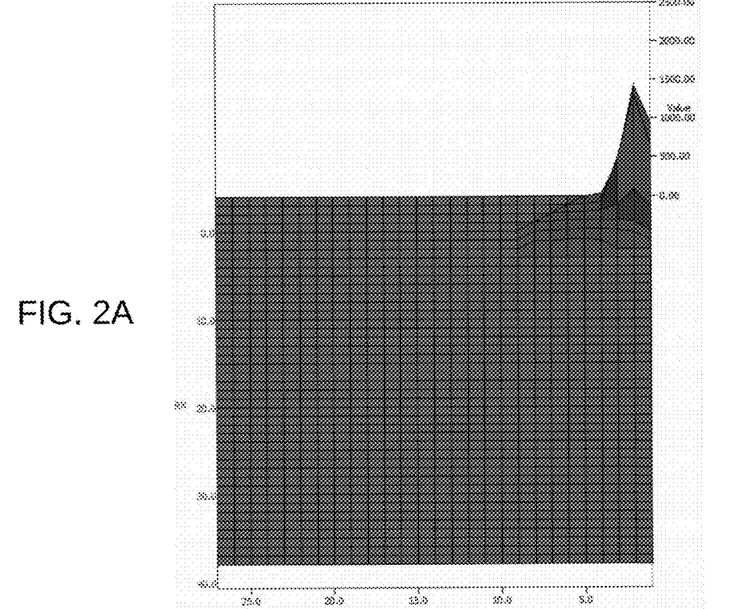
FIG. 2A is a graph showing touch data acquired by the electronic device of FIG. 1 during a touch that is not forceful.
Figure 2B:
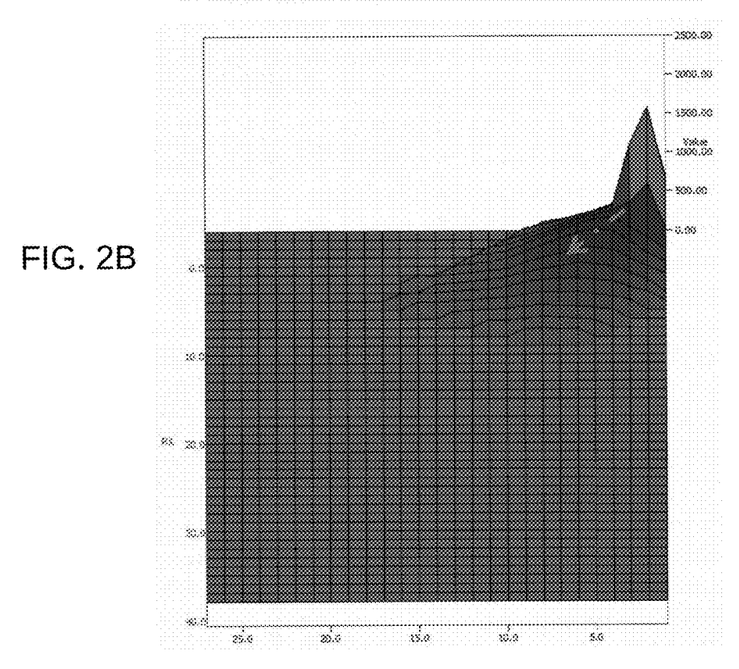
FIG. 2B is a graph showing touch data acquired by the electronic device of FIG. 1 during a touch that is forceful.
Figure 2C:
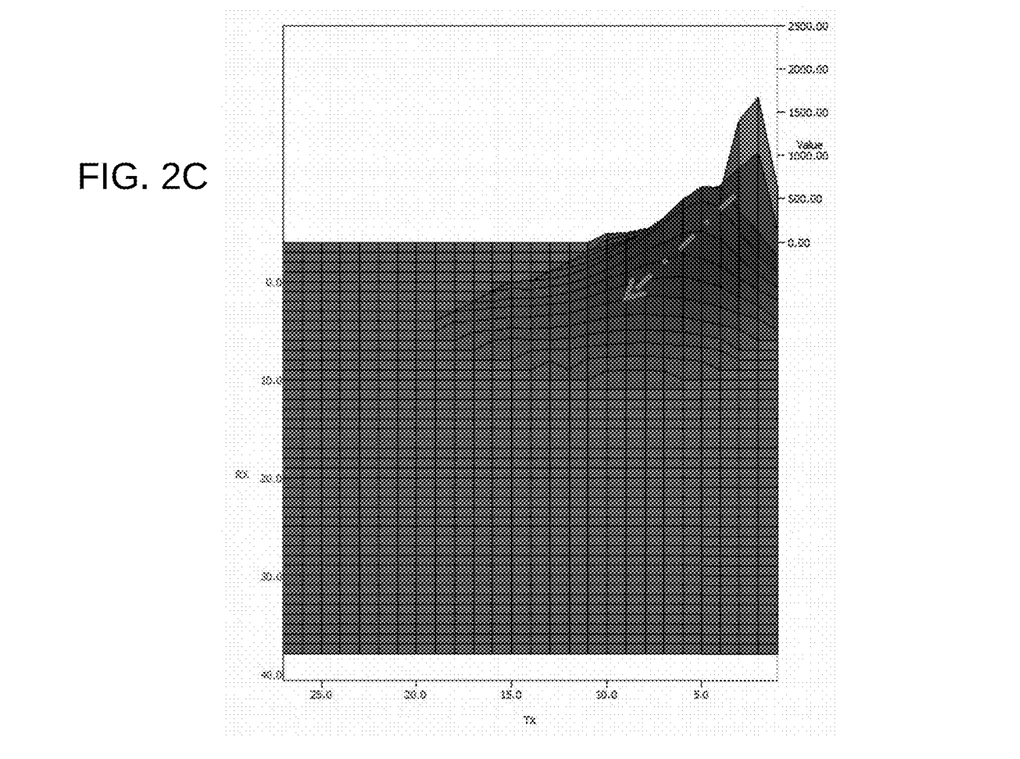
FIG. 2C is a graph showing touch data acquired by the electronic device of FIG. 1 during a touch that is more forceful than that shown in FIG. 2B.

Touch data collected and processed by the touch screen controller 106 for a non-forceful touch is shown in FIG. 2A. The coordinates of a touch are determined based upon a weighted centroid of adjacent nodes having touch data values above a certain threshold. However, as shown in FIGS. 2B and 2C, for forceful touches, the touch data spreads around the area of the actual touch, moving the resultant coordinate away from the actual touch, as indicated by the arrows.

Figure 3:
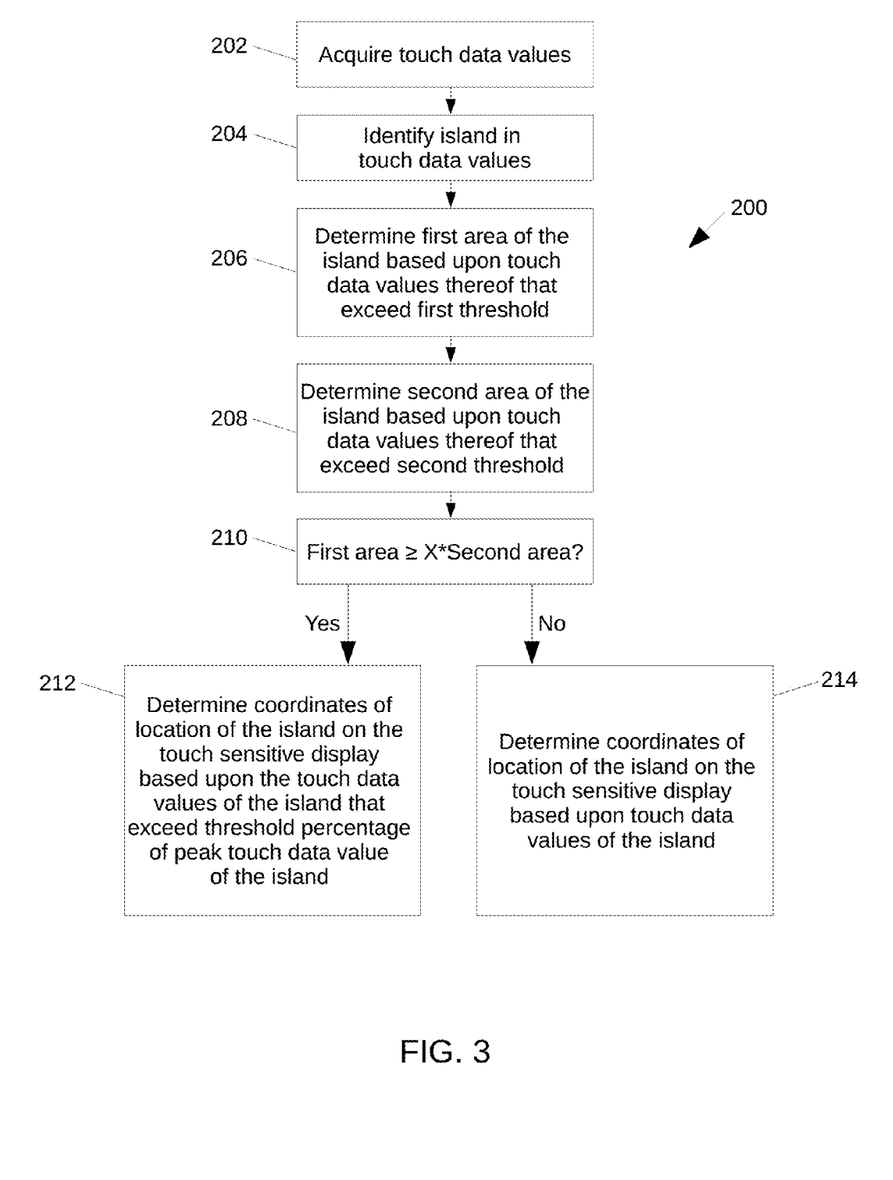
FIG. 3 is a flowchart of a technique of operating the electronic device of FIG. 1 so as to accurately determine touch coordinates regardless of the forcefulness of the touch.

So as to avoid this undesirable effect in the presence of forceful touches, the touch screen controller 106 operates as will now be described with reference to FIG. 3. The touch screen controller 106 acquires touch data values corresponding to different locations of the touch sensitive display 104 (Block 202). The touch screen controller 106 then identifies island(s) in the touch data, the island(s) being touch data values acquired from adjacent locations of the touch sensitive display 104 that indicate a potential touch (Block 204).

The touch screen controller 106 then determines a first area of the island(s) based upon touch data values thereof that exceed a first threshold value (Block 206). This first threshold value represents a "potential touch" threshold above which may indicate a touch has been made to the touch sensitive display 104. Thereafter, the touch screen controller 106 determines a second area of the island(s) based upon touch data values thereof that exceed a second threshold value different than the first threshold value (Block 208). The inventors have found that setting the second threshold value as being one half a peak touch data value of the island is particularly useful. By peak touch data value, it is means the largest touch data value recorded in the matrix for that iteration of touch data collection.

The touch screen controller 106 compares the first area to a multiple (such as twice) of the second area (Block 210) and takes action based on the result thereof. The first area of the island being less than the multiple of the second area indicates that a touch is a non-forceful touch, whereas the first area of the island being greater than or equal to the multiple of the second area indicates that the touch is a forceful touch.

If the first area of the island is less than the multiple of the second area, the coordinates of the island (i.e. the location thereof on the touch sensitive display 104) are determined based on using the touch data values of the island that exceed the first threshold (Block 214). That is, if the first area of the island is less than the multiple of the second area, determination of the coordinates of the island proceeds using techniques known to those of skill in the art, such as by determining the coordinates from the weighted centroid of the touch data values.

If the first area of the island is greater than or equal to the multiple of the second area, the coordinates of the island are determined based on using the touch data values of the island that exceed a third threshold value and not the touch data values of the island that do not exceed the third threshold value (Block 212). The third threshold value may be greater than or equal to the first threshold value, and may be 70%-95% of the peak touch data value for the island. Thus, when the first area of the island is greater than or equal to the multiple of the second area, determination of the coordinates of the island is based on but a subset of the touch data values of the island, and in particular, touch data values of the island that are at least 70% of the peak touch data value for that island.

Figure 4A:
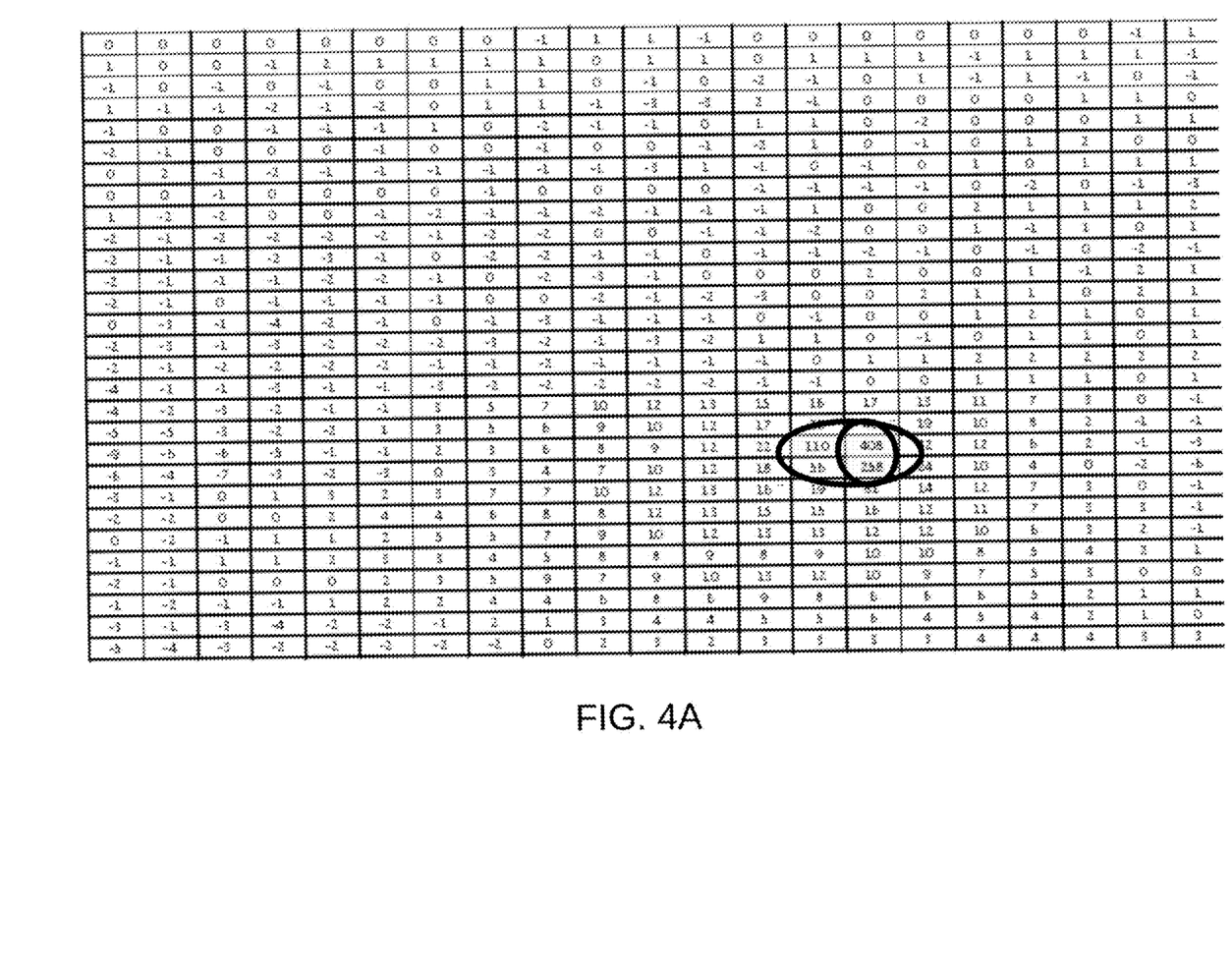
FIG. 4A is a chart of touch data acquired by the electronic device of FIG. 1 during a touch that is not forceful.
Figure 4B:
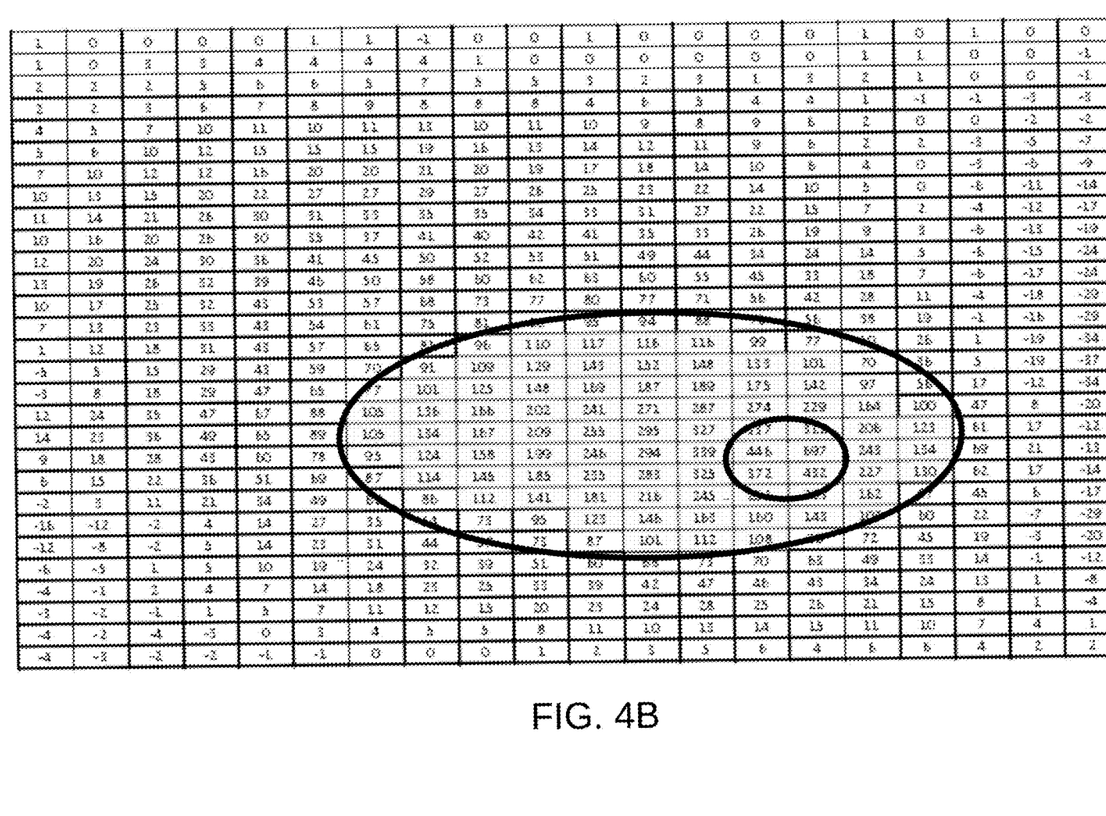
FIG. 4B is a chart of touch data acquired by the electronic device of FIG. 1 during a touch that is forceful.

Example matrices of the touch data values are shown in FIGS. 4A-4B. In FIG. 4A, the island is shown circled. The first area of the island (calculated by counting data values above the first threshold) is 3, whereas the second area of the island (calculated by counting data values above 204, which is the peak value of 408 divided by 2) is 2. Therefore, the first area is not greater or equal to than twice the second area, so this touch is a non-forceful touch.

In FIG. 4B, the island is shown circled. The first area of the island is 77, whereas the second area of the island (calculated by counting data values above 348.5, which is the peak value of 697 divided by 2) is 4. Therefore, the first area is greater than twice the second area, so this touch is a forceful touch.

As is evident from the above descriptions, the greater the first area is than the second area, the greater the force of the touch. Thus, the above provides for not only the discrimination between forceful touches and non-forceful touches, but also the discrimination between different forceful touches. It also follows that the above allows the determination of a force of a given touch.

Although the above has been described with reference to the touch screen controller 106 performing the described steps and techniques, it should be appreciated that in some applications, the SoC 102 may instead perform the above described steps and techniques.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
   a touch sensitive display;
   a processor coupled to the touch sensitive display and configured to:
   acquire touch data values corresponding to different locations of the touch sensitive display;
   identify at least one island in the touch data, the at least one island comprising touch data values acquired from adjacent locations of the touch sensitive display indicating a potential touch;
   determine a first area of the at least one island from touch data values of the at least one island that exceed a first touch data threshold value;
   determine a second area of the at least one island from touch data values of the at least one island that exceed a second touch data threshold value different than the first touch data threshold value;
   if the first area is less than a multiple of the second area, determine coordinates of a location of the at least one island on the touch sensitive display based upon the touch data values indicating the potential touch; and
   if the first area is at least the multiple of the second area, determine coordinates of a location of the at least one island on the touch sensitive display based upon the touch data values indicating the potential touch that exceeds a third touch data threshold value and not the touch data values indicating the potential touch that do not exceed the third touch data threshold value.

2. The electronic device of claim 1, wherein the second touch data threshold value is one half a peak touch data value of the at least one island.

3. The electronic device of claim 1, wherein the multiple of the second area is twice the second area.

4. The electronic device of claim 1, wherein the third touch data threshold value is equal to the first touch data threshold value.

5. The electronic device of claim 1, wherein the third touch data threshold value is greater than the first touch data threshold value.

6. The electronic device of claim 1, further comprising a transparent layer disposed adjacent to and spaced apart from the touch sensitive display; and wherein the first area being at least the multiple of the second area indicates that the potential touch is pushing against the transparent layer with a force sufficient such that the transparent layer is bending toward the touch sensitive display.

7. The electronic device of claim 6, wherein the processor is configured to compare the first area to the second area to determine a force with which the potential touch is pushing against the transparent layer.

8. The electronic device of claim 1, wherein the processor is part of a touch screen controller.

9. The electronic device of claim 1, wherein the processor is part of a system on a chip.

10. The electronic device of claim 1, wherein the third touch data threshold value is between 70% and 95% of a peak touch data value of the at least one island.

11. An electronic device, comprising:
    a touch screen controller configured to:
    acquire a matrix of touch data values;
    identify at least one island in the matrix, the at least one island comprising adjacent touch data values indicating a potential touch of a touch sensitive screen;
    determine a first area of the at least one island based upon touch data values thereof that exceed a first threshold value;
    determine a second area of the at least one island based upon touch data values thereof that exceed a second threshold value different than the first threshold value;
    if the first area is less than a multiple of the second area, determine coordinates of a location of the at least one island on the touch sensitive display based upon the touch data values indicating the potential touch; and
    if the first area is at least a multiple of the second area, determine coordinates of a location of the at least one island on the touch sensitive display based upon the touch data values that exceed a third threshold value but not the touch data values that do not exceed the third threshold value.

12. The electronic device of claim 11, wherein the second threshold value is one half a peak touch data value of the at least one island.

13. The electronic device of claim 11, wherein the multiple of the second area is twice the second area.

14. The electronic device of claim 11, further comprising a transparent layer disposed adjacent to and spaced apart from the touch sensitive display; and wherein the first area being at least the multiple of the second area indicates that the potential touch is pushing against the transparent layer with a force sufficient such that the transparent layer is bending toward the touch sensitive display.

15. The electronic device of claim 11, wherein the threshold value is between 70% and 95% of a peak touch data value of the at least one island.

16. A method, comprising:
    acquiring touch data values corresponding to different locations of a touch sensitive display;
    identifying at least one island in the touch data values, the at least one island comprising touch data values acquired from adjacent locations of the touch sensitive display indicating a potential touch;

determining a first area of the at least one island based upon touch data values thereof that exceed a first threshold value;

determining a second area of the at least one island based upon touch data values thereof that exceed a second threshold value different than the first threshold value; and determining coordinates of a location of the at least one island on the touch sensitive display based upon the touch data values indicating that the potential touch that exceed a threshold percentage of a peak touch data value of the at least one island, when the first area is at least a multiple of the second area, thereby indicating that a transparent layer adjacent to and spaced apart from the touch sensitive display is bending toward the touch sensitive display.

17. The method of claim 16, further comprising determining coordinates of a location of the at least one island on the touch sensitive display based upon the touch data values indicating the potential touch, when the first area is less than the multiple of the second area.

18. The method claim 16, wherein the second threshold value is one half the peak touch data value of the at least one island.

19. The electronic device of claim 16, wherein the multiple of the second area is twice the second area.

* * * * *